(12) United States Patent
Kondo et al.

(10) Patent No.: US 8,641,052 B2
(45) Date of Patent: Feb. 4, 2014

(54) SUSPENSION DEVICE

(75) Inventors: Takuhiro Kondo, Tokyo (JP);
Yoshifumi Kobayashi, Tokyo (JP);
Motohiko Honma, Toyota (JP);
Takayuki Tachi, Toyota (JP)

(73) Assignees: Kayaba Industry Co., Ltd., Minato-ku (JP); Toyota Jidosha Kabushiki Kaisha, Aichi (JP)

( * ) Notice: Subject to any disclaimer, the term of this patent is extended or adjusted under 35 U.S.C. 154(b) by 94 days.

(21) Appl. No.: 13/383,063

(22) PCT Filed: Oct. 27, 2009

(86) PCT No.: PCT/JP2009/068741
§ 371 (c)(1),
(2), (4) Date: Apr. 10, 2012

(87) PCT Pub. No.: WO2011/004510
PCT Pub. Date: Jan. 13, 2011

(65) Prior Publication Data
US 2012/0187640 A1 Jul. 26, 2012

(30) Foreign Application Priority Data
Jul. 10, 2009 (JP) .................................. 2009-163312

(51) Int. Cl.
*B60G 17/00* (2006.01)

(52) U.S. Cl.
USPC ................... 280/5.514; 280/5.515; 188/266.2; 188/267; 267/217; 267/225; 267/226

(58) Field of Classification Search
USPC ............... 280/5.514, 5.15, 6.159, 124.154; 188/266.1, 266.2, 266.3, 267; 267/217, 267/221, 225, 226
See application file for complete search history.

(56) References Cited

U.S. PATENT DOCUMENTS

| | | | | |
|---|---|---|---|---|
| 4,030,713 A | * | 6/1977 | Palmer | 267/221 |
| 4,145,036 A | * | 3/1979 | Moonen et al. | 267/221 |
| 8,109,371 B2 | * | 2/2012 | Kondo et al. | 188/266.3 |
| 8,398,091 B2 | * | 3/2013 | Inoue et al. | 280/5.507 |
| 8,469,164 B2 | * | 6/2013 | Kondo et al. | 188/299.1 |
| 8,499,903 B2 | * | 8/2013 | Sakuta et al. | 188/202 |
| 2008/0164111 A1 | | 7/2008 | Inoue et al. | |
| 2009/0065314 A1 | | 3/2009 | Kondo et al. | |
| 2009/0095584 A1 | * | 4/2009 | Kondo et al. | 188/267 |
| 2009/0120745 A1 | * | 5/2009 | Kondo et al. | 188/267 |
| 2009/0121398 A1 | * | 5/2009 | Inoue | 267/140.14 |
| 2010/0117277 A1 | * | 5/2010 | Ohta et al. | 267/140.14 |
| 2010/0200343 A1 | * | 8/2010 | Kondo et al. | 188/267 |

FOREIGN PATENT DOCUMENTS

| | | |
|---|---|---|
| CN | 101065259 A | 10/2007 |
| EP | 1829719 A1 | 9/2007 |
| EP | 2012043 A1 | 1/2009 |
| JP | 2006-143146 A | 6/2006 |
| JP | 2007-290639 A | 11/2007 |
| JP | 2008-95800 A | 4/2008 |
| JP | 2008-256179 A | 10/2008 |
| KR | 10-2007-0085437 A | 8/2007 |
| WO | 2006/571909 A1 | 6/2006 |
| WO | 2007/125770 A1 | 11/2007 |

* cited by examiner

*Primary Examiner* — James English
(74) *Attorney, Agent, or Firm* — McGlew and Tuttle, P.C.

(57) ABSTRACT

A suspension device (S) as a solution for the problem of the present invention includes: an active suspension unit (U) equipped with a linear actuator (A) and a first fluid pressure damper (D1) connected to the actuator (A) to extend and retract in the same direction; and a second fluid pressure damper (D2) arranged in parallel with the active suspension unit (U).

19 Claims, 4 Drawing Sheets

SUSPENSION DEVICE

FIELD OF THE INVENTION

The present invention relates to an improvement in a suspension device that suppresses relative movement between a vehicle body and vehicle axle with the electromagnetic force generated in a motor.

DESCRIPTION OF THE RELATED ART

As this type of suspension device, Japanese Patent Application Laid-Open No. 2008-95800 discloses a device that is configured to include: an actuator having a threaded shaft, a ball screw nut that is rotatably threaded to the threaded shaft, and a motor coupled to the ball screw nut; and a fluid pressure damper in which a rod is coupled to the threaded shaft, the device being interposed between the body and axle of a vehicle by coupling the motor to the body side and a cylinder of the fluid pressure damper to the axle side, and actively controlling the relative movement between the body and axle with the thrust force of the actuator.

DISCLOSURE OF THE INVENTION

However, since the above conventional suspension device connects the actuator with a motor as the driving source to the fluid pressure damper in series, if the motor becomes unable to output torque for any reason and the actuator comes to extend and retract without any resistance, it will become impossible to realize a damping force, and thus, there is a possibility that vehicle ride quality will deteriorate during such a failure.

Therefore, the present invention has been conceiving taking the above-mentioned shortcoming into consideration, and sets as an object thereof to provide a suspension device for which a damping force is realized even during failure so that the ride quality is never harmed.

In order to achieve the above object, the suspension device to solve the problem of the present invention includes: an active suspension unit that includes an actuator of linear-motion type and a first fluid pressure damper that is connected to the actuator to extend and retract in the same direction as the actuator; and a second fluid pressure damper arranged in parallel with the active suspension unit.

According to the suspension device of the present invention, the second fluid pressure damper is made to be arranged in parallel to the active suspension unit; therefore, even if the actuator becomes unable to output a thrust force for any, reason and the actuator comes to extend and retract without any resistance, by the second fluid pressure damper realizing a damping force, the vehicle ride quality will not deteriorate even during failure.

DETAILED DESCRIPTION OF THE INVENTION

Figure 1:
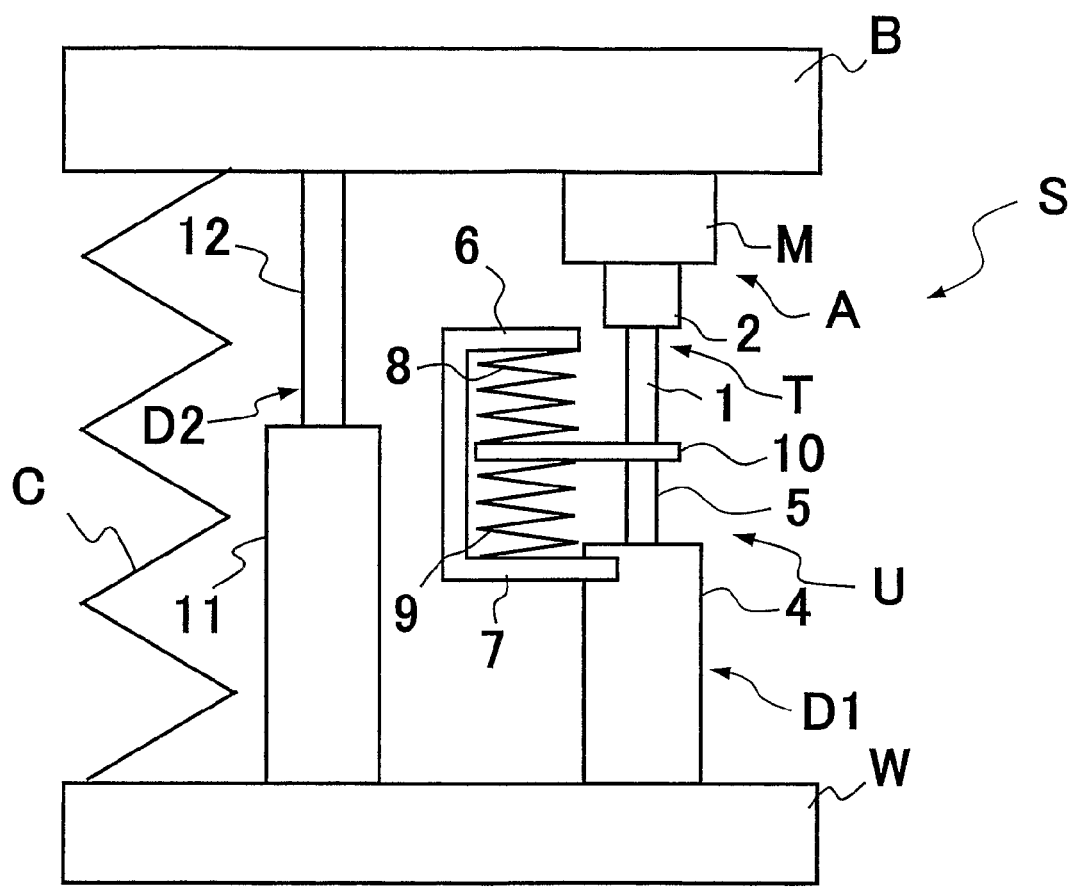
FIG. 1 is a view conceptually showing a suspension device according to one embodiment of the present invention.

Hereinafter, the present invention will be explained based on the embodiments shown in the drawings. As shown in FIG. 1, a suspension device S is interposed in parallel with a suspension spring C between a spring lower member W and a spring upper member B, and basically, is configured to include an active suspension unit U provided with a linear actuator A and a first fluid pressure damper D1 that is connected together in a telescoping direction to the actuator A, and a second fluid pressure damper D2 arranged in parallel with the active suspension unit U.

The actuator A is a linear actuator that extends and retracts, and is configured to include a linear motion member 1, a motion conversion mechanism T that converts the linear motion of the linear motion member 1 into rotational motion of a rotational member 2, and a motor M that is coupled to the rotational member 2, for example. Then, in the case of this actuator A, the extension-retraction operation is enabled by causing the linear motion member 1 to undergo reciprocal motion in a relatively linear direction in relation to the motor M and rotational member 2, with the linear motion member 1 defined as one of the extension-retraction operation ends, and the motor M and rotational member 2 defined as one of the extension-retraction operation ends. It should be noted that the extension-retraction operation end indicates a relative movement position during the extension-retraction operation of the actuator A, and does not mean only the two ends in the extension-retraction operation direction of the actuator A. In addition, the motion conversion mechanism T more specifically is configured by a lead screw mechanism configured by a threaded shaft and threaded nut, or a mechanism such as rack and pinion or worm gear, for example. In this case, the motion conversion mechanism T causes the linear motion member 1 to undergo linear motion according to the rotation of the rotational member 2, while being able to convert linear motion of the linear motion member 1 into rotational motion of the rotational member 2, whereby reversible motion conversion is made possible.

Furthermore, since the drive source is established as the motor M in this actuator A, in the case of using the rotational member 2 of the motion conversion mechanism T, i.e. a lead screw mechanism, it is configured so that the rotational motion of the member on a rotating side of either the threaded shaft or the threaded nut is transmitted to the motor M, and in the case of driving by applying electric power to the motor M, it is possible to cause the linear motion member 1 to undergo linear motion, i.e. to realize a function as an actuator.

In addition, the motor M is configured so as to function as a generator when rotational motion is forcibly input from the side of the rotational member 2 by an external input, and functions so as to suppress linear motion of the linear motion member 1 by generating torque that suppresses the rotational motion of the rotational member 2 by way of the induced electromotive force. In other words, in this case, the motor M suppresses the linear motion of the above-mentioned linear motion member 1 with the regeneration torque generated by regenerating the kinetic energy externally input and converting into electrical energy.

Therefore, this actuator A can provide a thrust force in the axial direction to the linear motion member 1 by actively causing torque to be generated in the motor M, and in a case of the linear motion member 1 being forcibly made to move by an external force, can suppress the above-mentioned motion with the regeneration torque generated by the motor M.

Then, simultaneously with being able to suppress relative movement between the spring upper member B and the spring lower member W by the thrust force and torque generated by the above-mentioned actuator A, this suspension device S can take advantage of the function as the actuator to simultaneously perform attitude control of the spring upper member B, specifically the body of the vehicle, whereby it is possible to realize a function as an active suspension.

It should be noted that, since the motor M and the rotational member of the motion conversion mechanism T simply have to be coupled to enable transmission of rotational motion, a reduction mechanism, or link, coupler or the like that enable the transmission of rotational motion may be interposed between the motor M and the above-mentioned rotational member.

In addition, since it just has to be a motor that realizes the above function, it is possible to use various forms of motors, and more specifically, a direct or alternating current motor, induction motor, synchronous motor, or the like can be used as the motor M.

It should be noted that, in the case of the present embodiment, the motion conversion mechanism T that converts the rotational motion of the motor M into linear motion is configured so as to reversibly convert between rotational motion and linear motion by establishing a feed screw mechanism or the like; however, in the case of the actuator A just having to function only as an actuator, it may be a mechanism that performs irreversible motion conversion whereby rotational motion is converted into linear motion but linear motion is not converted to rotational motion. In addition, in this case, since the motor M is not required to also function as a generator with an external force, and the suspension device S simply functions as an active suspension, it may be configured in this way.

Furthermore, as described above, since the actuator A includes the motor M and the motion conversion mechanism T, it is advantageous in the aspect of being able to amplify the torque generated by the motor M and convert into the thrust force of the linear motion member 1, and being able to realize a large thrust force; however, the actuator A may be configured as an actuator in which a coil is provided at the stator side and a magnet is provided at the rotor side, and exhibits the extension-retraction operation by causing the rotor to reciprocally move in the linear direction relative to the stator, without equipping with a motion conversion mechanism.

Moreover, the first fluid pressure damper D1 is configured so as to realize a predetermined damping force when exhibiting an extension-retraction operation in which a rod 5 goes in and out relative to the damper main body 4, and is mainly provided with the purpose of absorbing high frequency oscillations input to the active suspension unit U.

It should be noted that, although the first fluid pressure damper D1 is not illustrated in detail due to being well known, the damper main body 4 includes a cylindrical cylinder into which a piston provided at a leading end of the rod 5 is inserted slidably, and is configured by filling working fluid into two pressure chambers divided by the piston inside of the above-mentioned cylinder. In addition, in a case of the fluid being a liquid, if the first fluid pressure damper D1 is established in single-rod form, a reservoir or air chamber that compensates for the volume change of the volume fraction of the rod 5 going in and out of the inside of the cylinder is included in the damper main body 4. In addition to a liquid such as a hydraulic oil or water, or an aqueous solution, the working fluid of the first fluid pressure damper D1 may be a gas.

The first fluid pressure damper D1 is interposed between the actuator A and the spring lower member W with mainly the purpose of absorbing high frequency oscillations. More specifically, one end thereof is connected to the linear motion member 1, which is one extension-retraction operation end of the actuator A, and the other end is coupled to the spring lower member W.

When coupling between the first fluid pressure damper D1 and the actuator A, it is only necessary to connect one of the damper main body 4 of the first fluid pressure damper D1 or a rod 5 to the linear motion member 1 of the actuator A, and on the other hand, it is only necessary to connect the other one of the cylinder 3 and the piston rod 5 to the spring lower member W. Therefore, the first fluid pressure damper D1 may be interposed so-called right-side-up between the actuator A and the spring lower member W, or may be interposed therebetween to be upside-down. In addition, in the case of the present embodiment, the first fluid pressure damper D1 is connected in series with the actuator A to extend and retract in the same direction; however, not only a case of connecting to make an extension-retraction operation axis of the first fluid pressure damper D1 and an extension-retraction operation axis of the actuator A to match, but also connecting these axes to be off-center is included in the ways to connect to extend and retract in the same direction.

It should be noted that, in addition to directly coupling like members of coupling targets without interposing any other members, the general concept of coupling in the present disclosure includes interposing another member and coupling like members of coupling targets.

Then, by the above-mentioned first fluid pressure damper D1 being coupled in series to the actuator A, which has a large moment of inertia, does not easily extend and retract in response to input of high frequency oscillations, but tends to transmit oscillations, the first fluid pressure damper D1 is configured so as to, in response to an input of high frequency oscillation such as an oscillation having a relatively large acceleration, absorb this oscillation energy.

In addition, a biasing means for biasing an unillustrated piston that is slidably inserted inside of the damper main body 4 of the first fluid pressure damper D1 and is coupled to the rod 5 so as to cause the piston position to a predetermined neutral position may be provided. By doing this, it is possible to prevent a state in which the first fluid pressure damper D1 remains at maximum extension or maximum retraction and becomes unable to absorb high frequency oscillation, causing the vehicle ride quality to deteriorate. It should be noted that, as shown in FIG. 1, the biasing means may be provided with spring collars 6 and 7 sandwiching an assembly in which the pair of springs 8 and 9 are arranged in series to the damper main body 4 from above and below, and may be configured so as to sandwich a spring seat 10 provided to the rod 5 with the spring 8 and the spring 9, for example. In addition, although not illustrated, it may be configured so that the springs are accommodated in each of the two pressure chambers inside of the cylinder, and the piston position is positioned in a predetermined neutral position by arranging so that the piston is sandwiched by these springs.

It should be noted that neutral position is a position at which the piston is positioned in a state in which a load is not acting on the first fluid pressure damper D1, and can be set arbitrarily, not necessarily being established at the stroke center or middle of the cylinder of the first fluid pressure damper D1.

The active suspension unit U configured in this way can cause the linear motion member 1 to undergo linear motion in the vertical direction in FIG. 1 by rotationally driving the rotational member 2 with the torque generated by the motor M, as explained in the foregoing, and thus can also suppress linear motion of the linear motion member 1 in response to input of an external force, by providing a thrust force to the linear motion member 1 by actively causing torque to be generated in the motor M. In addition, when the linear motion member 1 is forcibly made to undergo linear motion by an external force, the motor M coupled to the rotational member 2 is rotationally driven to generate a torque causing an induction electromotive force, and functions so as to suppress the linear motion of the linear motion member 1. In other words, in the case of the motor M being forcibly driven by way of an external force, it can suppress linear motion of the linear motion member 1 by functioning as a generator and actively generating torque to resist the external force.

Therefore, this active suspension unit U does not only simply generate a damping force to suppress the linear motion of the linear motion member 1, but also functions as an actuator, and thus, when this suspension device S is used by interposing between the body and axle of a vehicle, it is possible to simultaneously perform attitude control of the body of the vehicle, whereby it is possible to function as an active suspension.

It should be noted that, in the case of the present embodiment, the motion conversion mechanism that converts the rotational motion of the motor M into linear motion is established as a lead screw mechanism configured by a threaded shaft 1 and a ball screw nut 2; therefore, it is configured so as to reversibly convert between rotational motion and linear motion; however, in a case that it is only necessary for the actuator A to function just as an actuator, it may be a mechanism that performs irreversible motion conversion, converting rotational motion to linear motion, but not converting linear motion to rotational motion. In this case, since the suspension device S simply functions as an active suspension without requiring the motor M to also function as a generator with external forces, it may be configured in this way.

In addition, this suspension device S has the second fluid pressure damper D2 arranged in parallel to the active suspension unit U configured in the above way, and the second fluid pressure damper D2 is interposed between the spring upper member B and the spring lower member W of the vehicle.

The second fluid pressure damper D2 is configured so as to realize a predetermined damping force for when a rod 12 exhibits extension and retraction operations to go in and out relative to a damper main body 11, and although the structure is not illustrated in detail due to being well known, the damper main body 11 includes a cylinder of cylindrical shape into which a piston provided at a leading end of the rod 12 is inserted slidably, and is configured by filling working fluid into two pressure chambers divided by the piston inside of the above-mentioned cylinder. In addition, in a case of the fluid being a liquid, if the second fluid pressure damper D2 is established as single-rod form, a reservoir or air chamber that compensates for the volume change of the volume fraction of the rod 12 going in and out inside of the cylinder is included in the damper main body 11. In addition to a liquid such as a hydraulic oil, water, or an aqueous solution, the working fluid of the second fluid pressure damper D2 may be a gas.

In this way, the suspension device S has the second fluid pressure damper D2 arranged in parallel to the active suspension unit U; therefore, even if the actuator A becomes unable to output a thrust force for any reason and the actuator A comes to extend and retract without any resistance, by the second fluid pressure damper D2 realizing a damping force, the vehicle ride quality will not deteriorate even during failure.

In addition, upon suppressing oscillation of the spring upper member B with the suspension device S, when the direction in which thrust force is generated by the actuator A and the direction in which damping force is generated by the second fluid pressure damper D2 are the same direction, the thrust force of the actuator A can be reduced compared to a conventional suspension device, and can cause the energy consumption to be reduced.

It should be noted that, if configured so as to be able to adjust the generated damping force of the second fluid pressure damper D2, in the case that the thrust force generation direction of the actuator A and the damping force generation direction of the second fluid pressure damper D2 becomes opposite upon suppressing oscillation of the spring upper member B with the suspension device S, an increase in the load of the actuator A can be suppressed by adjusting the damping force of the second fluid pressure damper D2 to a minimum.

Figure 2:
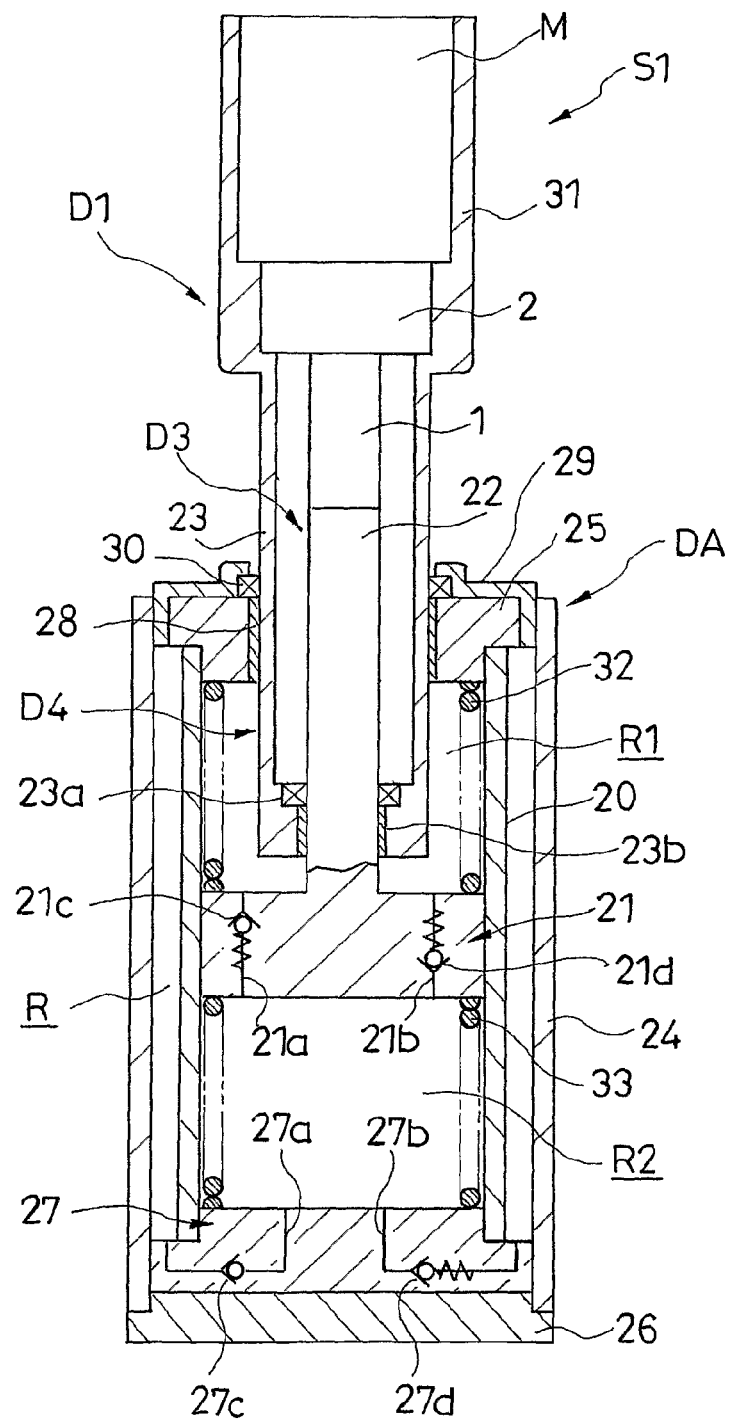
FIG. 2 is a view conceptually showing a suspension device according to another embodiment of the present invention.

The above first fluid pressure damper D1 and second fluid pressure damper D2 are respectively configured as independent dampers as described above; however, both can be integrated by having one cylinder 20 shared, as shown in the suspension device S1 of another embodiment in FIG. 2.

A fluid pressure damper DA in which a first fluid pressure damper D3 and a second fluid pressure damper D4 are integrated includes one cylinder 20 and the two output shafts of a piston rod 22 and a hollow rod 23.

More specifically, the fluid pressure damper DA is configured to include a cylinder 20; a piston 21 that is inserted inside of the cylinder 20 slidably and defining two pressure chambers R1 and R2 inside of the cylinder 20; a piston rod 22 having one end coupled to the piston 21; a hollow rod 23 that is movably inserted inside of the cylinder 20 and installed at the outer circumference of the above-mentioned piston rod 22 movably; and a reservoir R in communication with the pressure chamber R2. Then, in the case of the present embodiment, a liquid such as a hydraulic oil or water, or an aqueous solution is filled as the fluid inside of the cylinder 20, and in addition to the fluid, a gas is sealed inside of the reservoir R.

Among these, the first fluid pressure damper D3 includes the cylinder 20, the piston 21 inserted inside of the cylinder 20 slidably, and the piston rod 22 having one end coupled to the piston 21, and the other end of the piston rod 22 is connected to the linear motion member 1 as one of the extension-retraction operation ends of the actuator A.

On the other hand, the second fluid pressure damper D4 includes the hollow rod 23 that is movably inserted inside of the above-mentioned cylinder 20 and installed at the outer circumference of the above-mentioned piston rod 22 movably, and connects an upper end in FIG. 2, which is one end of the hollow rod 23, to the motor M serving as the other one of the extension-retraction operation ends of the actuator A.

When explained in more detail, the cylinder 20 is accommodated inside of an outer cylinder 24, is sandwiched between an annular rod guide 25 fitted to the upper end in FIG. 2 of the outer cylinder 24 and a cap 26 blocking the lower end in FIG. 2 of the outer cylinder 24, and is fixed to the outer cylinder 24.

When the cylinder 20 is fixed to be accommodated inside of the outer cylinder 24 in this way, an annular gap is provided between the cylinder 20 and the outer cylinder 24, thereby forming the reservoir R in this annular gap. It should be noted the reservoir R is formed by the annular gap formed between the cylinder 20 and the outer cylinder 24 covering the outer circumference of the cylinder 20; however, it may be configured to be provided at another location. In addition, although the reservoir R is provided in order to compensate for the volumetric change inside of the cylinder 20 when the piston rod 22 and hollow rod 23 go in and out of the inside of the cylinder 20, in the case that the working fluid of the fluid pressure damper DA is a gas, the reservoir R may be eliminated.

A dividing member 27 is interposed between the lower end of the cylinder 20 and the above-mentioned cap 26, and the insides of the reservoir R and cylinder 20 are divided by this dividing member 27.

In addition, the piston 21 is inserted inside of the cylinder 20 slidably, whereby the two pressure chambers R1 and R2 are formed inside the cylinder 20. Passages 21a and 21b communicating between the above-mentioned pressure chamber R1 and pressure chamber R2 are provided in the piston 21, and damping-force generating elements 21c and 21d are provided midstream in the passages 21a and 21b, respectively. Then, the damping-force generating element 21c permits the flow of fluid only from the pressure chamber R1 to the pressure chamber R2, and is configured so as to establish the passage 21a as one-way and present resistance to the flow of fluid passing therethrough. In addition, the damping-force generating element 21d conversely permits the flow of fluid only from the pressure chamber R2 to the pressure chamber R1, and is configured so as to establish the passage 21b as one-way and present resistance to the flow of fluid passing therethrough. The damping-force generating elements 21c and 21d only have to present resistance to the flow of fluid when the fluid passes through the above-mentioned passages 21a and 21b, and cause a predetermined loss of pressure to occur. More specifically, it is possible to employ a damping valve such as an orifice or leaf valve, for example.

In addition, passages 27a and 27b communicating between the reservoir R and the pressure chamber R2 are provided in the dividing member 27. A check valve 27c that allows flow only from the reservoir R to the pressure chamber R2 is provided midstream of the passage 27a, and a damping-force generating element 27d that allows flow only from the pressure chamber R2 to the reservoir R as well as presenting resistance to the flow is provided midstream of the passage 27b.

The hollow rod 23 is pivotally supported via a cylindrical bushing 28 to the inner circumference of the annular rod guide 25, which is provided at the upper end of the cylinder 20 and seals the upper end in FIG. 2 of the cylinder 20, and the lower end in FIG. 2 of the hollow rod 23 is movably inserted inside of the cylinder 20. The upper end in FIG. 2 of the hollow rod 23 is integrated with a cylindrical case 31, which retains the rotational member 2 and the motor M, serving as the other of the extension-retraction operation ends of the actuator A. This hollow rod 23 and case 31 may not only be integrated by threaded fastening, welding or another fixing means with these as individual members, but these may also be integrated so as to be embodied in a portion of one component.

At the inner circumference, the case 31 fixingly retains the motor M, as well as retaining the rotational member 2 rotatably, and furthermore, internally accommodates the linear motion member 1 to allow linear motion.

In addition, the hollow rod 23 includes an annular seal member 23a and a bushing 23b at the inner circumference thereof at the lower end in FIG. 2, causing this seal member 23a to slidably contact the outer circumference of the piston rod 22 to seal the outer circumference of the piston rod 22, as well as causing the bushing 23b to similarly slidably contact the outer circumference of the piston rod 22 to permit sliding in the axial direction of the piston rod 22, while positioning the piston rod 22 in the radial direction.

Then, a coil spring 32 interposed between the piston 21 and the rod guide 25 is accommodated inside of the pressure chamber R1. A coil spring 33 is accommodated inside the pressure chamber R2 between the piston 21 and the dividing member 27. A biasing means is configured by these coil springs 32 and 33, sandwiching the piston 21 to bias from above and below, thereby positioning the piston 21 relative to the cylinder 20 to a predetermined neutral position. By providing a biasing means formed by the coil springs 32 and 33, it is possible to prevent a state in which the first fluid pressure damper D3 remains at maximum extension or maximum retraction and becomes unable to absorb high frequency oscillation, causing the vehicle ride quality to deteriorate. In addition, in this case, since the biasing means is accommodated inside of the cylinder 20, there is the advantage in that it is possible to provide a naturally biasing means to the fluid pressure damper DA in which the piston rod 22 is accommodated inside of the hollow rod 23, whereby the fluid pressure damper DA including the biasing means can be reduced in size.

Furthermore, the lower end of a cylindrical seal case 29 is interposed between the inner circumference at the upper end in FIG. 2 of the outer cylinder 24 and the outer circumference of the rod guide 25. An annular seal 30 slidably contacting the outer circumference of the hollow rod 23 is accommodated inside of the seal case 29, whereby the outer circumference of the hollow rod 23 is closely sealed.

In addition, the upper end in FIG. 2 of the piston rod 22 is coupled to the lower end in FIG. 2 of the linear motion member 1 serving as one of the extension-retraction operation ends of the actuator A, and the lower end in FIG. 2 thereof is coupled to the above piston 21. Furthermore, the piston rod 22 is configured so as to be able to relatively move in the vertical direction in FIG. 2, which is the axial direction relative to the hollow rod 23. The hollow rod 23 and piston rod 22 are configured so as to be able to displace in the vertical direction relative to the cylinder 20 independently from each other, unless the hollow rod 23 is abutting the piston 21.

Then, in a case of only the hollow rod 23 moving downward relative to the cylinder 20 without the piston rod 22 displacing relative to the cylinder 20, the fluid inside the pressure chamber R1 flows out to the reservoir R via the passage 21a provided to the piston 21 and the passage 27b provided to the dividing member 27, accompanying the penetration of the hollow rod 23 to inside of the cylinder 20. Since resistance is presented to the flow of this fluid by the damping-force generating elements 21c and 27d, the pressure inside of the pressure chamber R1 rises, and the hollow rod 23 is pressurized inside of the pressure chamber R1 with the annular lower end of the hollow rod 23 as the pressure receiving surface, whereby the above-mentioned downward movement of the hollow rod 23 is suppressed.

In addition, in a case of only the hollow rod 23 moving upward relative to the cylinder 20 without the piston rod 22 displacing relative to the cylinder 20, it is configured so that fluid is fed from the reservoir R to inside the pressure chamber R1 expanding in volume, via the passage 21b provided to the piston 21 and the passage 27a, accompanying the withdrawal of the hollow rod 23 from inside of the cylinder 20. Since the check valve 27c opens, the pressure chamber R2 is maintained at the same pressure as the reservoir R; however, resistance is presented to the flow of fluid toward the pressure chamber R1 by the damping-force generating element 21d; therefore, the pressure inside the pressure chamber R1 is decreased, whereby the above-mentioned upward movement of the hollow rod 23 is suppressed. Accordingly, the fluid pressure damper DA realizes a damping force against vertical movement of the hollow rod 23 relative to the cylinder 20, suppressing this movement.

Furthermore, in a case of only the piston rod 22 moving downward relative to the cylinder 20 without the hollow rod 23 displacing relative to the cylinder 20, the fluid inside of the pressure chamber R2 that is compressed accompanying the penetration of the piston rod 22 to inside the cylinder 20 moves to the pressure chamber R1 through the passage 21b provided in the piston 21, together with the fluid that becomes excess accompanying the volume inside of the cylinder 20 decreasing by way of the penetration of the piston rod 22 to inside of the cylinder 20 flowing out to the reservoir R via the passage 27b. Since resistance is presented to the above-mentioned flows of fluid by the damping-force generating elements 21d and 27d, a difference in pressure between the pressure chamber R1 and the pressure chamber R2 arises, and this differential pressure acts on the piston 21 so that the above-mentioned downward movement of the piston rod 22 is suppressed.

In addition, in a case of only the piston rod 22 moving upward relative to the cylinder 20 without the hollow rod 23 displacing relative to the cylinder 20, since the pressure chamber R1 is compressed, the fluid moves from the pressure chamber R1 to the pressure chamber R2 through the passage 21a, together with the volume inside of the cylinder 20 expanding and the fluid being deficient accompanying the withdrawal of the piston rod 22 from inside of the cylinder 20; therefore, it is configured so that fluid of the deficient amount is fed from the reservoir R to the inside of the pressure chamber R2 via the passage 27a. Since the check valve 27c opens, the pressure chamber R2 is maintained at the same pressure as the reservoir R; however, resistance is presented to the flow of fluid toward the pressure chamber R2 by the damping-force generating element 21c; therefore, a differential pressure between the pressure chamber R1 and the pressure chamber R2 arises, and this differential pressure acts on the piston 21 so that the above-mentioned upward movement of the piston rod 22 is suppressed.

More specifically, in a case of only the piston rod 22 displacing relative to the cylinder 20 without the hollow rod 23 displacing relative to the cylinder 20, since the hollow rod 23 does not have an effect on the fluctuation of the volume inside of the cylinder 20, the same operation as a conventional, well-known fluid pressure damper having only a single output shaft is exhibited, and a damping force is realized against vertical movement of the piston rod 22 relative to the cylinder 20, thereby suppressing this movement.

In other words, the fluid pressure damper DA is configured so as to generate a damping force against displacement of the piston rod 22 and hollow rod 23 relative to the cylinder 20, thereby suppressing this displacement.

In addition, in a case of the piston rod 22 and the hollow rod 23 operating together simultaneously, since the piston rod 22 and the hollow rod 23 do not move relatively, it comes to exhibit the same operation as a conventional, well-known fluid pressure damper having only one output shaft, and a damping force is realized against vertical movement of the piston rod 22 and the hollow rod 23 relative to the cylinder 20, thereby suppressing this movement.

Furthermore, in a case of the piston rod 22 and the hollow rod 23 operating in opposite phases, one among the piston rod 22 and the hollow rod 23 exhibits an operation penetrating to inside of the cylinder 20; however, since the other one among the piston rod 22 and the hollow rod 23 exhibits an operation withdrawing from the inside of the cylinder 20, fluid of the volume difference amount of the piston rod 22 and the hollow rod 23 advancing and retracting inside of the cylinder 20 comes to be supplied from the reservoir R to the cylinder 20; however, a damping force suppressing movements of the piston rod 22 and hollow rod 23, respectively, comes to be generated.

Therefore, with the first fluid pressure damper D3 and second fluid pressure damper D4 are integrated into the fluid pressure damper DA by configuring in this way, the piston rod 22, which is the output shaft of the first fluid pressure damper D3, is connected to one of the extension-retraction operation ends of the actuator A, and the hollow rod 23, which is the output shaft of the second fluid pressure damper D4, is connected to the other of the extension-retraction operation ends of the actuator A; therefore, similarly to the suspension device S of the first embodiment, also for the suspension device S1 of the present embodiment, it is made a configuration including the actuator A and the first fluid pressure damper D3 connected to the actuator A to extend and retract in the same direction so as to configure the active suspension unit U1, and in which the second fluid pressure damper D4 is arranged in parallel to this active suspension unit U1.

Therefore, since the second fluid pressure damper D4 is arranged in parallel to the active suspension unit U1 in the suspension device S1 of the other embodiment as well, even if the actuator A becomes unable to output a thrust force for any reason and the actuator A comes to extend and retract without any resistance, by the second fluid pressure damper D4 integrated in the fluid pressure damper DA realizing a damping force, the vehicle ride quality will not deteriorate even during failure.

In addition, since the first fluid pressure damper D3 and the second fluid pressure damper D4 share the cylinder 20 and are integrated into the fluid pressure damper DA, it has a smaller footprint and is lighter weight, being able to curb the amount of working fluid and number of components, compared to a suspension device in which the first fluid pressure damper and the second fluid pressure damper are provided independently, whereby the ease of mounting in a vehicle drastically improves, along with the production cost also being reduced.

Furthermore, in the present embodiment, the piston rod 22 is accommodated inside of the hollow rod 23, together with the linear motion member 1, which is an extension-retraction operation end of the actuator A coupled to this piston rod 22, the rotational member 2 and the motor M being accommodated inside of the case 31, and this case 31 and the hollow rod 23 are integrated; therefore, the driving portion of the active suspension unit U1 is concealed by the case 31 and the hollow rod 23, and is protected without interference from outside. In addition, even if the suspension spring elastically supporting the spring upper member B is established as an air spring, an air chamber is formed so as to cover the outer circumference of this suspension device S1, and the pressure of the air chamber acts on the outer circumference of the suspension device S1, the pressure of the air chamber will not act on the insides of the case 31 and the hollow rod 23, and thus does not have high pressure on the motor M; therefore, also in the case of establishing an air spring as the suspension spring, the reliability of the suspension device S1 will improve and it will not be necessary to hermetically seal the inside of the motor M, which would be difficult to hermetically seal.

In addition thereto, in a case of a lateral force acting on the hollow rod 23 integrated with the case 31, since it made into a structure in which this lateral force distributes to be received by the piston 21 and the rod guide 25, it is possible to prevent lateral force from being input to the actuator A. Furthermore, it can be established so that, depending on the pressure inside the reservoir and the setting of the damping-force generating elements 21c, 21d and 27d, in a case of the piston rod 22 penetrating to inside of the cylinder 20, a force in the direction to make rise up in FIG. 2 acts on the hollow rod 23, and in a case of the piston rod 22 withdrawing from the cylinder 20, a force in the direction to make descend in FIG. 2 acts on the hollow rod 23. By establishing in this way, when the actuator A generates a thrust force in the extending direction to try to make the vehicle height rise, and exhibits an operation in which the piston rod 22 descends, a force in the rising direction comes to act on the hollow rod 23; therefore, the vehicle height is easily made to rise. Conversely, when the actuator A generates a thrust force in the contracting direction to try to make the vehicle height descend, and exhibits an operation in which the piston rod 22 rises, a force in the descending direction comes to act on the hollow rod 23; therefore, the vehicle height is easily made to descend.

Therefore, in regards to vehicle height adjustment by way of the actuator A, to address the first fluid pressure damper D3 working so as to suppress this, it is possible to establish so as to resist the first fluid pressure damper D3 and so as to act on the second fluid pressure damper D4 to aid the vehicle height adjustment by integrating the first fluid pressure damper D3 and the second fluid pressure damper D4 into the fluid pressure damper DA in this way, whereby it is possible to absorb high frequency oscillations with the first fluid pressure damper D3 while reducing the drive loss of the actuator A. Consequently, this suspension device S1 can reduce the energy consumption of the actuator A while maintaining the vehicle ride quality.

Figure 3:
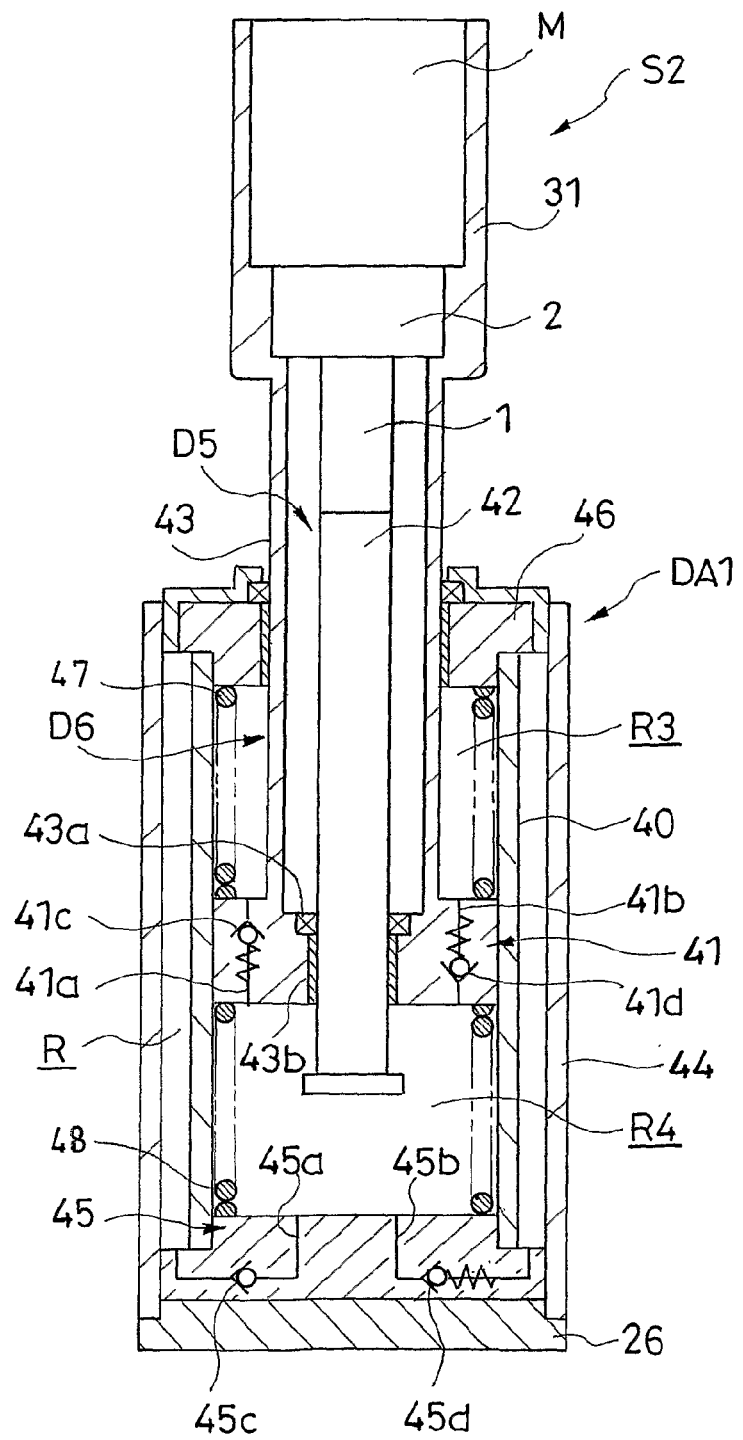
FIG. 3 is a view conceptually showing a suspension device according to a modified example of the other embodiment of the present invention.

It should be noted that, upon integrating a first fluid pressure damper D5 and a second fluid pressure damper D6, a fluid pressure damper DA1 is configured as a suspension device S2 according to a modified example of the other embodiment shown in FIG. 3 by: a cylinder 40; a hollow rod 43 inserted inside of the cylinder 40 movably; a rod 42 inserted inside of the hollow rod 43 movably; an annular piston 41 that is inserted inside of the cylinder 40 slidably, partitioning the inside of the cylinder 40 into the two pressure chambers R3 and R4, and is installed to the outer circumference of the hollow rod 43; an outer cylinder 44 that covers the cylinder 40; and a reservoir R that is formed between the cylinder 40 and the outer cylinder 44, and is in communication with the pressure chamber R4.

Then, the first fluid pressure damper D5 includes the cylinder 40 and the rod 42, the upper end in FIG. 3 of the rod 42 being connected to one of the extension-retraction operation ends of the actuator A. The second fluid pressure damper D6 includes the above-mentioned hollow rod 43 and the annular piston 41 installed at the outer circumference of the hollow rod 43, and couples the upper end in FIG. 3 of the hollow rod to the motor M serving as the other of the extension-retraction operation ends of the actuator A via the case 31.

In addition, passages 41a and 41b communicating between the pressure chambers R3 and R4 are provided in the annular piston 41, a damping-force generating element 41c that permits the flow of fluid only from the pressure chamber R3 to the pressure chamber R4 is provided in the passage 41a, and a damping-force generating element 41d that permits the flow of fluid only from the pressure chamber R4 to the pressure chamber R3 side is provided in the passage 41b.

A dividing member 45 is provided between the reservoir R and the pressure chamber R4. Passages 45a and 45b communicating between the reservoir R and the pressure chamber R4 are provided in the dividing member 45. A check valve 45c that permits flow only from the reservoir R to the pressure chamber R4 is provided midstream of the passage 45a, and a damping-force generating element 45d that permits flow only from the pressure chamber R4 to the reservoir R as well as presenting resistance to this flow is provided midstream of the passage 45b.

In addition, the hollow rod 43 is pivotally supported to an annular rod guide 46 that blocks an upper end in FIG. 3 of the cylinder 40. The hollow rod 43 includes, at a lower end of the inner circumference, a cylindrical seal member 43a slidably contacting and sealing at the outer circumference of the rod 42 inserted to the inside of the hollow rod 43, and a bushing 43b, causing this seal member 43a to slidably contact the outer circumference of the piston rod 42 to seal the outer circumference of the piston rod 42, as well as causing the bushing 43b to similarly slidably contact the outer circumference of the piston rod 42 to permit sliding in the axial direction of the piston rod 42, while positioning the piston rod 42 in the radial direction.

Even when the fluid pressure damper DA1 is configured in this way, it is possible to realize a damping force suppressing movement of the rod 42 and the hollow rod 43 relative to the cylinder 40, similarly to the fluid pressure damper DA, and since the first fluid pressure damper D5 is arranged in series to the actuator A and the second fluid pressure damper D6 is arranged in parallel thereto, the suspension device S1 can exert operational effects similar to the above-mentioned suspension device S1.

In addition, in this case, the annular piston 41 of the second fluid pressure damper D6 is biased by being sandwiched from above and below by coil springs 47 and 48 accommodated inside of the cylinder 40, thereby positioning the annular piston 41 to a predetermined neutral position relative to the cylinder 40. By biasing the annular piston 41 by way of a biasing means formed by the coil springs 47 and 48, it is possible to prevent a state in which the second fluid pressure damper D6 remains at maximum extension or maximum retraction and becomes unable to absorb oscillation, causing the vehicle ride quality to deteriorate. In addition, the coil springs 47 and 48 are established so as to be accommodated inside of the cylinder 40, and thus there are the advantages in that a naturally biasing means can be provided to the fluid pressure damper DA1 and the fluid pressure damper DA1 including the biasing means can be reduced in size; however, the configuration of the biasing means is not to be limited to the above-mentioned coil springs 47 and 48.

Figure 4:
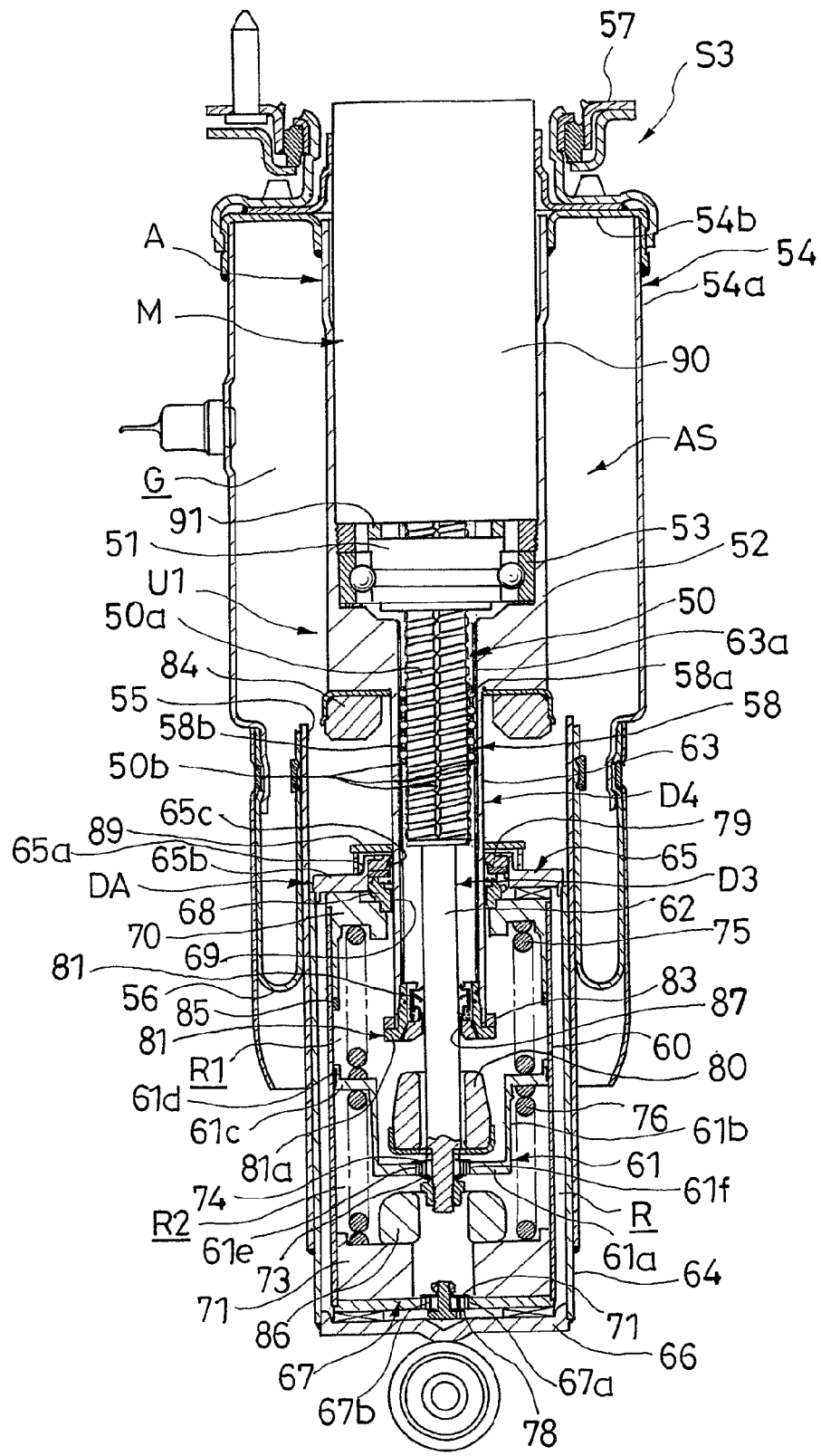
FIG. 4 is a cross-sectional view showing a specific configurational example of a suspension device according to the other embodiment of the present invention.

Next, a suspension device S3 further refining the configuration of the suspension device of the above-mentioned other embodiment will be explained. As shown in FIG. 4, this suspension device S3 is configured to include an actuator A, and a two-shaft fluid pressure damper DA in which a first fluid pressure damper and a second fluid pressure damper are integrated.

The actuator A is configured to include a motion conversion mechanism established as a lead screw mechanism including a threaded shaft 50 as a linear motion member and a ball screw nut 51 as a rotational member threaded to the threaded shaft 50 rotatably; and a motor M coupled to the ball screw nut 51. It should be noted that it may be configured so that the motor M is coupled to the threaded shaft, and the ball screw nut threaded to the threaded shaft is jammed to allow linear motion. Then, with the threaded shaft 50 as one of the extension-retraction operation ends and the motor M and ball screw nut 51 as the other end of the extension-retraction ends in this actuator A, the threaded shaft 50 relatively undergoes linear motion in the axial direction relative to the motor M and the ball screw nut 51 and extends, by way of the rotational driving of the motor M.

In addition, in this case, the motor M is accommodated inside of a cylindrical case 52 and is fixed thereto. The ball screw nut 51 as the rotational member is also accommodated inside of the case 52, as well as being rotatably retained to the case 52 via a ball bearing 54 installed inside of the case 52. It should be noted that, although the motor M includes a case 90 accommodating and retaining a stator that is not illustrated, the case 52 may be utilized as the case of the motor M, and the stator may be directly retained by the case 52.

In addition, the case 52 is established as one body with a hollow rod 63 of a fluid pressure damper described later, with the upper end in FIG. 4 of a single tube molded in a large diameter as the case 52, and with a small diameter part on the lower side thereof as the hollow rod 63.

Moreover, in the case of the present embodiment, this suspension device S3 includes, at an outer circumferential side, an air spring AS that functions as a suspension spring using an air chamber G defined by an annular air chamber 54 coupled to the outer circumference of the case 52 of the actuator A, an air piston 55 provided at the outer circumference of an outer cylinder 64 of the fluid pressure damper DA described later, and a cylindrical diaphragm 56 bridged between an air chamber 54 and air piston 55.

Furthermore, in this case, this suspension device S3 is configured so as to be interposed between the body and axle of the vehicle by coupling the case 52 of the actuator A to the body of the vehicle with a mount 57, and coupling the lower end in FIG. 4 of the outer cylinder 64 of the fluid pressure damper DA to the axle of the vehicle. In other words, upon interposing between the body and axle of a vehicle, which is not illustrated, this suspension device S3 is configured so as to be interposed so that the actuator A is coupled to the body and the fluid pressure damper DA is coupled to the axle.

More specifically, the actuator A is configured to include the motor M, the ball screw nut 51 coupled to a rotor 91 of the motor M, and the threaded shaft 50 threaded to the ball screw nut 51, whereby the rotational motion of the ball screw nut 51 can be converted into linear motion of the threaded shaft 50, and it is made possible to convert the linear motion of the threaded shaft 50 into rotational motion of the ball screw nut 51.

The threaded shaft 50 is formed in a cylindrical shape, helical thread grooves 50a being formed in the outer circumference thereof, and linear longitudinal grooves 50b being formed in four rows along the shaft line, i.e. along the linear motion direction of the threaded shaft. Then, this threaded shaft 50 is inserted inside of the case 52 and the hollow rod 63, and four rows of longitudinal grooves 63a are formed in the inner circumference of the hollow rod 63 to oppose the threaded shaft 50.

On the other hand, although the ball screw nut 51 is not illustrated in detail due to be well known, for example, it is configured to include a helical raceway opposing the threaded grooves of the threaded shaft 50 provided at the inner circumference of a cylindrical main body, a recirculating path provided inside the cylindrical main body and communicating both ends of the above-mentioned raceway, a plurality of balls that is accommodated in this raceway and the recirculating path and travelling in the threaded grooves 50a, and spaces interposed between the respective balls, each ball being configured so as to be able to recirculate in the raceway and recirculating path formed in the above-mentioned loop shape.

Furthermore, since the threaded shaft 50 is made to undergo linear motion by rotational driving of the ball screw nut 51, a jam mechanism for the threaded shaft 50 is necessary; however, in the present embodiment, this jam mechanism is configured by including the linear longitudinal grooves 50b provided to the outer circumference of the threaded shaft 50, the four rows of longitudinal grooves 63a provided along the axial direction to the inner circumference of the hollow rod 63 integrated with the case 52, and the bearing 58 including the balls 58a that travel in these longitudinal grooves 50b and 63a.

Then, the bearing 58 of ball cage type is interposed between the hollow rod 63 and the threaded rod 50. This bearing 58 is configured to include a plurality of balls 58a set next to each other to form four rows in the vertical direction in FIG. 4, which is the axial direction, and that travel on both the longitudinal groove 50a on the threaded shaft 50 side and the longitudinal groove 63 on the hollow rod 63 side opposing this, and a cylindrical cage 58b that retains the balls 58a rollably.

In this bearing 58, when the actuator extends or retracts and the hollow rod 63 and threaded shaft 50 exhibit relative movement in the axial direction, the balls 58a roll and move between the threaded shaft 50 and hollow rod 63 in the vertical direction, which is the axial direction. More specifically, the bearing 58 comes to move half the distance of the relative movement distance between the hollow rod 63 and the threaded shaft 50; however, it is configured so that the balls 58a do not fall out from the longitudinal groove 50a of the threaded shaft 50 by always opposing the threaded shaft in the stroke range of the threaded shaft.

Then, when the threaded shaft 50 moves in a stroke in the vertical direction in FIG. 4 relative to the hollow shaft 63, since the balls 58a travelling in both longitudinal grooves 50a and 63 roll, this is permitted while presenting substantially no resistance to the above-mentioned stroke of the threaded shaft 50.

In contrast, when torque acts on the threaded shaft 50 to try to rotate relative to the hollow rod 63, the balls 58a go into both the inside of the longitudinal grooves 50a and 63a; therefore, the threaded shaft 50 is prevented from rotating relative to the case 52 integrated with the hollow rod 63, and does not rotate in the circumferential direction together with the rotation of the ball screw nut 51 as the rotational member, and thus the threaded shaft 50 is configured so to be able to undergo linear motion by driving of the motor M.

More specifically, the fluid pressure damper DA is configured to include a cylinder 60; a piston 61 that is inserted inside of the cylinder 60 slidably and defining two pressure chambers R1 and R2 inside of the cylinder 60; a piston rod 62 having one end coupled to the piston 61; the hollow rod 63 that is inserted inside of the cylinder 60 movably and installed at the outer circumference of the above-mentioned piston rod 62 movably; and a reservoir R in communication with the pressure chamber R6. Then, in the case of the present embodiment, a liquid such as a working oil or water, or an aqueous solution is filled as the fluid inside of the cylinder 60, and in addition to the fluid, a gas is sealed inside of the reservoir R.

Among these, the first fluid pressure damper D3 includes the cylinder 60, the piston 61 inserted inside of the cylinder 60 slidably, and the piston rod 62 having one end coupled to the piston 61, and the other end of the piston rod 62 connects to the lower end in FIG. 4 of the threaded shaft 50 as one of the extension-retraction operation ends of the actuator A.

On the other hand, the second fluid pressure damper D4 includes the hollow rod 63 that is inserted inside of the above-mentioned cylinder 60 movably and installed at the outer circumference of the above-mentioned piston rod 62 movably, and the hollow rod 63 is connected, via the case 52 integrated therewith, to the motor M serving as the other of the extension-retraction operation ends of the actuator A.

If explained in more detail, an annular spring collar 70 is fitted to the top end of the cylinder 60, and a dividing member 67 dividing the cylinder 60 and the reservoir R and a cylindrical spring collar 71 are fitted to the lower end of the cylinder 60. Then, the cylinder 60 is accommodated inside of an outer cylinder 64 together with the spring collars 70 and 71 and the dividing member 67, is sandwiched between an annular seal case 65 fitted to the upper end in FIG. 4 of the outer cylinder 64 and a cap 66 blocking the lower end in FIG. 4 of the outer cylinder 24, and is fixed to the outer cylinder 64.

When the cylinder 60 is accommodated and fixed inside of the outer cylinder 64 in this way, an annular gap is provided between the cylinder 60 and the outer cylinder 64, thereby forming the reservoir R in this annular gap. It should be noted that the reservoir R is formed by the annular gap formed between the cylinder 60 and the outer cylinder 64 covering the outer circumference of the cylinder 60; however, it may be configured to be provided at another location. In addition, although the reservoir R is provided in order to compensate for the volumetric change inside of the cylinder 60 when the piston rod 62 and hollow rod 63 go in and out inside of the cylinder 60, in the case that the working fluid of the fluid pressure damper DA is a gas, the reservoir R may be eliminated.

In addition, the seal case 65 includes a roofed-cylindrical case main body 65a and a flange 65b provided to an outer circumference at an end of the case main body 65a, the outer circumference of the flange 65b being fixed to the outer cylinder 64. Furthermore, an insertion hole 65c permitting insertion of the hollow rod 63 is provided in the roof portion of the case main body 65a. A rod guide 68 that is annular and pivotally supports the hollow rod 63 slidably is fitted inside of the case main body 65a. This rod guide 68 includes, at the inner circumference thereof, a cylindrical bushing 69 that slidably contacts at the outer circumference of the hollow rod 63, and is fixed in a state sandwiched by the spring collar 70 fitted to the upper end of the cylinder 60 and the seal case 65, and fitted to the case main body 65a of the seal case 65.

In addition, the piston 61 is configured to include an annular disk 61a, a tube portion 61b rising up from the outer circumference of the disk 61a, a flange-like spring collar portion 61c provided at the outer circumference of the tube portion 61b, and a slidable-contact portion 61d that rises up from the outer circumference of the spring collar portion 61c and slidably contacts the inner circumference of the cylinder 60. The piston 61 is assembled to the piston rod 62 by inserting a lower end in FIG. 4 of the piston rod 62 into the inner circumference of the disk 61a, and is fixed by a piston nut 72. By inserting this piston 61 into the inside of the cylinder 60, the inside of the cylinder 60 is divided, whereby the two pressure chambers R1 and R2 are formed.

Furthermore, passages 61e and 61f communicating between the above-mentioned pressure chamber R1 and pressure chamber R2 are provided in the disk 61a of the piston 61. The passage 61e is open and shut by a leaf valve 73 layered at the lower end of the disk 61a, and is established to be one-way permitting the flow of fluid only from the pressure chamber R1 to the pressure chamber R2, as well as being configured so as to present resistance to the flow of fluid passing through the passage 61e by way of the leaf valve 73. The passage 61f is open and shut by a leaf valve 74 layered at the lower end of the disk 61a, and is established to be one-way permitting the flow of fluid only from the pressure chamber R1 to the pressure chamber R2, as well as being configured so as to present resistance to the flow of fluid passing through the passage 61f by way of the leaf valve 74.

In addition, coil springs 75 and 76 serving as biasing means are interposed between the spring collar portion 61c of the piston 61 and the spring collar 70 and between the spring collar portion 61c and the spring collar 71, respectively. The piston 61 is biased from being sandwiched from both above and below by these coil springs 75 and 76, whereby the piston 61 is positioned to a predetermined neutral position at which the biasing forces of the coil springs 75 and 76 are balanced relative to the cylinder 60. When the piston 61 displaces relative to the cylinder 60, these coil springs 75 and 76 cause the piston 61 to return to the above-mentioned neutral position by way of the biasing forces thereof. It should be noted that the neutral position may not necessary be set at the middle of the cylinder 60.

On the other hand, the dividing member 67 is fixed to the cylinder 60 by being sandwiched by the cylinder 60 and the cap 66, and divides the reservoir R and the pressure chamber R2. In addition, the dividing member 67 includes passages 67a and 67b communicating between the reservoir R and the pressure chamber R2. The passage 67a is configured so as to open and shut by way of a check valve 77 layered at an upper end of the dividing member 67, and is configured so as to permit flow only from the reservoir R to the pressure chamber R2 by way of this check valve 77. In addition, the passage 67b is open and shut by a leaf valve 78 layered at the lower end of the dividing member 67, and is established to be one-way permitting the flow of fluid only from the pressure chamber R2 to the reservoir R, as well as being configured so as to present resistance to the flow of fluid passing through the passage 67b by way of the leaf valve 78.

The hollow rod 63 is pivotally supported to the inner circumference of the rod guide 68 via the cylindrical bushing 69, and the lower end thereof in FIG. 4 is inserted into the inside of the cylinder 60 movably. The upper end in FIG. 4 of the hollow rod 63 is integrated with the cylindrical case 52 that retains the rotational member 2 and the motor M serving as the other of the extension-retraction operation ends of the actuator A, as explained above. Furthermore, the outer circumference of the hollow rod 63 is closely sealed by an annular seal member 79 accommodated in the case main body 65a of the above-mentioned seal case 65.

The piston rod 62 is inserted into the inside of the hollow rod 63. The upper end in FIG. 4 of the piston rod 62 is coupled to the lower end in FIG. 4 of the threaded shaft 50 serving as one of the extension-retraction operation ends of the actuator A, and the above piston 61 is coupled to the lower end in FIG. 4 of the piston rod 62. A cylindrical seal case 81 retaining an annular seal member 82 is threaded to the lower end in FIG. 4 of the hollow rod 63. This seal member 82 seals the outer circumference of the piston rod 62 by slidably contacting the outer circumference of the piston rod 62. In addition, a bushing 87 that slidably contacts the outer circumference of the piston rod 62 is established at the inner circumference of the lower end of the seal case 81, and allows sliding of the piston rod 62 in the axial direction, while positioning the piston rod 62 in the radial direction relative to the hollow rod 63.

In this way, the piston rod 62 is configured so as to enable relative movement in the vertical direction in FIG. 4, which is the axial direction, relative to the hollow rod 63. Then, when an annular cushion 80 provided at the outer circumference of the piston rod 62 abuts the lower end of the hollow rod 63, the movement of the piston rod 62 upward in FIG. 4 is regulated relative to the hollow rod 63.

It should be noted that the seal case 81 mounted to the lower end in FIG. 4 of the hollow rod 63 includes a flange 81a at the outer circumference thereof. An annular cushion 83 installed at the outer circumference of the hollow rod 63 is seated in the upper end in FIG. 4 of the flange 81a. When the cushion 83 abuts the inner circumference of the spring collar 70, movement of the hollow rod 63 upward in FIG. 4 relative to the cylinder 60 is regulated, whereby the shock during maximum extension of the overall suspension device S3 is mitigated by this cushion 83.

In addition, an annular cushion 84 is provided that is seated in a stepped portion formed at the contact portion between the case 52 and the hollow rod 63, and is installed at the outer circumference of the hollow rod 63. When the hollow rod 63 penetrates to inside of the cylinder 60 by moving downward in FIG. 4, the cushion 84 ultimately abuts a cushion collar 89 mounted above the seal case 65 in FIG. 4, and any further penetration of the hollow rod 63 to inside of the cylinder is regulated, whereby the shock during maximum compression of the overall suspension device S3 is mitigated.

In other words, the cushions 83 and 84 perform regulation of the extension and compression of the second fluid pressure damper D4, and since the second fluid pressure damper D4 is arranged in parallel with the active suspension unit U1 made from the actuator A and the first fluid pressure damper D3, these cushions 83 and 84 are also able to regulate the extension and compression of the suspension device S3.

Furthermore, an annular cushion 85 is provided that is fitted to the inner circumference of the cylinder 60 and seated in the lower end of the spring collar 70. When this cushion 85 comes into contact with the upper end of a sliding portion 61d of the piston 61, the cushion 85 regulates the movement of the piston 61 upward in FIG. 4 relative to the cylinder 60. In addition, an annular cushion 86 is mounted to the upper end of the spring collar 71. When this cushion 86 comes into contact with the lower end of the disk 61a of the piston 61, the cushion 86 regulates the movement of the piston 61 downward in FIG. 4 relative to the cylinder 60. More specifically, the cushions 85 and 86 regulate the stroke range of the piston 62 relative to the cylinder 60, and are configured so as to regulate the extension and compression of the first fluid pressure damper D3 to mitigate shock during maximum extension and maximum compression thereof.

The fluid pressure damper DA configured in this way is a damper in which the fluid pressure damper of the other embodiment is embodied, and thus exerts functional effects similar to the fluid pressure damper of the above-mentioned other embodiment.

In addition, since the hollow pipe 63 integrated with the case 52 and the piston rod 62 are positioned in the radial direction relative to the cylinder 60 by configuring the fluid pressure damper DA in this way, centering of the actuator A and the fluid pressure damper DA is easy.

In addition thereto, in a case of a lateral force acting on the hollow rod 63 integrated with the case 31, since it is made into a structure in which this lateral force distributes to be received by the piston 61 and the rod guide 65, it is possible to prevent lateral force from being input to the actuator A. For that reason, it is possible to protect the threaded shaft 50, the ball screw nut 51 and the bearing 58 from lateral forces, whereby the reliability improves by smooth expansion and contraction of the suspension device S3 being ensured over a longer period of time.

Moreover, the annular air chamber 54 is coupled to the outer circumference of the case 52 of the actuator A. The air chamber 54 is configured to include a tube portion 54a established in a larger diameter than the outside diameter of the case 52, and an annular roof portion 54b coupling the upper end of the tube portion 54a to the case 52.

Furthermore, a cylindrical air piston 55 having a smaller diameter than the tube portion 54a of the air chamber 54 is coupled to the outer circumference of the outer cylinder 64 of the fluid pressure damper DA. The cylindrical diaphragm 56 having flexibility is bridged between the lower end of the tube portion 54a of the air chamber 54 and the central outer circumference of the air piston 55.

In this way, the air chamber G of the air spring AS is formed at the outer circumferences of the actuator A and fluid pressure damper DA by the air chamber 54, air piston 55 and diaphragm 56. It is configured so that gas can be supplied to the inside of this air chamber G and discharged therefrom. The height of the vehicle and the spring constant can be adjusted by regulating the air pressure inside of the air chamber G. The air spring AS is configured so as to function as a suspension spring. It should be noted that, although a suspension spring is established as the air spring AS in the case of the present embodiment, it goes without saying that the suspension spring may be established as a coil spring.

Then, in the suspension device S3 of the present embodiment as described above, the case 52 and the hollow rod 63 are integrated, and a driving portion of the active suspension unit U1 is concealed by the case 31 and the hollow rod 23, and is protected without interference from outside, while the pressure of the air chamber will not act on the insides of the case 52 and the hollow rod 63 even if the air spring AS is provided at the outer circumference thereof, and thus does not have high pressure on the motor M; therefore, also in the case of establishing an air spring as the suspension spring, the reliability of the suspension device S1 will improve and it will not be necessary to hermetically seal the inside of the motor M, which would be difficult to hermetically seal.

The suspension device S3 configured in this way is a device establishing the suspension device S1 of the other embodiment as a more refined configuration, arranging the second fluid pressure damper D4 in parallel with the active suspension unit U1; therefore, even if the actuator A becomes unable to output a thrust force for any reason and the actuator A comes to extend and retract without any resistance, by the second fluid pressure damper DD integrated in the fluid pressure damper DA realizing a damping force, the vehicle ride quality will not deteriorate even during failure.

In addition, since the first fluid pressure damper D3 and second fluid pressure damper D4 share the cylinder 60 and are integrated into the fluid pressure damper DA, it has a smaller footprint and is lighter weight, being able to curb the amount of working fluid and number of components, compared to a suspension device in which the first fluid pressure damper and the second fluid pressure damper are provided independently, whereby the ease of mounting in a vehicle drastically improves, along with the production cost also being reduced.

Furthermore, it can be established so that, depending on the pressure inside the reservoir R and the setting of the leaf valves 73, 74 and 78 and the check valve 77, in a case of the piston rod 62 penetrating to inside of the cylinder 60, a force in the direction to make rise up in FIG. 4 acts on the hollow rod 63, and in a case of the piston rod 62 withdrawing from the cylinder 60, a force in the direction to make descend in FIG. 4 acts on the hollow rod 63. By establishing in this way, when the actuator A generates a thrust force in the extending direction to try to make the vehicle height rise, and exhibits an operation in which the piston rod 62 descends, a force in the rising direction comes to act on the hollow rod 63; therefore, the vehicle height is easily made to rise. Conversely, when the actuator A generates a thrust force in the contracting direction to try to make the vehicle height descend, and exhibits an operation in which the piston rod 62 rises, a force in the descending direction comes to act on the hollow rod 63; therefore, the vehicle height is easily made to descend. Therefore, in regards to vehicle height adjustment by way of the actuator A, to address the first fluid pressure damper D3 working so as to suppress this, it is possible to establish so as to resist the first fluid pressure damper D3 and so as to act on the second fluid pressure damper D4 to aid the vehicle height adjustment by integrating the first fluid pressure damper D3 and the second fluid pressure damper D4 into the fluid pressure damper DA in this way, whereby it is possible to absorb high frequency oscillations with the first fluid pressure damper D3 while reducing the drive loss of the actuator A. Consequently, this suspension device S1 can reduce the energy consumption of the actuator A while maintaining the vehicle ride quality.

Although the explanations of the embodiments of the present invention in the foregoing are finished, it is a matter of course that the scope of the present invention is not to be limited to details illustrated or explained therein.

INDUSTRIAL APPLICABILITY

The suspension device of the present invention can be applied to the suspension of a vehicle.

The invention claimed is:

1. A suspension device, comprising:
   an active suspension unit that includes an actuator of linear-motion type and a first fluid pressure damper that is connected to the actuator to extend and retract in the same direction as the actuator; and
   a second fluid pressure damper arranged in parallel with the active suspension unit, wherein the first fluid pressure damper includes a cylinder and a rod that is inserted inside of the cylinder movably and connected to one extension-retraction operation end of the actuator, the second fluid pressure damper including the cylinder and a hollow rod that is movably inserted inside of the cylinder, installed to an outer circumference of the rod slidably as well as being connected to another extension-retraction operation end of the actuator, wherein a piston slidably inserted to inside of the cylinder is coupled to either one of the rod and the hollow rod, the piston defining two pressure chambers inside of the cylinder, and the other of the rod and the hollow rod is made to move in and out of one of the pressure chambers.

2. The suspension device according to claim 1, wherein the actuator includes a motor as a drive source, and is able to generate a damping force by way of electricity regeneration in response to an external input.

3. The suspension device according to claim 1, wherein:
   a passage including a damping force generating element that permits flow only from one pressure chamber to one other pressure chamber and a passage including a damping force generating element that permits flow only from the other pressure chamber to the one pressure chamber are provided to the piston;
   an outer cylinder that covers the outer circumference of the cylinder is provided forming a reservoir between the cylinder and the outer cylinder, and a dividing member that divides the cylinder and the reservoir is provided; and
   a passage including a damping force generating element that permits flow only from inside of the cylinder to the reservoir and presents resistance to the flow, and a passage including a check valve that permits flow only from the reservoir to inside of the cylinder are provided in the dividing member.

4. The suspension device according to claim 1, further comprising a biasing means for positioning the piston at a predetermined position relative to the cylinder.

5. The suspension device according to claim 1, wherein the actuator includes a linear motion member, a motion conversion mechanism that converts linear motion of the linear motion member into rotational motion of a rotational member, and a motor that is coupled to the rotational member.

6. The suspension device according to claim 5, wherein:
   the rotational member is a threaded nut coupled to the motor; and
   the linear motion member is a threaded shaft that is coupled to the rod of the first fluid pressure damper and is rotatably threaded to the threaded nut.

7. The suspension device according to claim 6, wherein the actuator includes a cylindrical case that retains a motor and rotatably retains a threaded nut, wherein the hollow rod and the case are integrated.

8. The suspension device according to claim 6, wherein the threaded shaft is inserted inside of the hollow rod, and includes a jam mechanism that stops rotation of the threaded shaft relative to the hollow rod.

9. The suspension device according to claim 8, wherein the jam mechanism includes:
   a threaded shaft lateral groove provided along an axial direction of the threaded shaft at an outer circumference thereof;
   a rod lateral groove that is provided along the axial direction at an inner circumference of the hollow rod and opposes the threaded shaft lateral groove;
   a plurality of balls that travel on both the threaded shaft lateral groove and the rod lateral groove that opposes the threaded shaft lateral groove; and
   a cage that retains the balls rollably.

10. The suspension device according to claim 7, further comprising an air spring that includes:
    a cylindrical air chamber member coupled to the case of the actuator;
    a cylindrical air piston coupled to the cylinder; and
    a cylindrical diaphragm that is bridged between the air chamber member and the air piston.

11. The suspension device according to claim 2, wherein:
    a passage including a damping force generating element that permits flow only from one pressure chamber to one other pressure chamber and a passage including a damping force generating element that permits flow only from the other pressure chamber to the one pressure chamber are provided to the piston;
    an outer cylinder that covers the outer circumference of the cylinder is provided forming a reservoir between the cylinder and the outer cylinder, and a dividing member that divides the cylinder and the reservoir is provided; and
    a passage including a damping force generating element that permits flow only from inside of the cylinder to the reservoir and presents resistance to the flow, and a passage including a check valve that permits flow only from the reservoir to inside of the cylinder are provided in the dividing member.

12. The suspension device according to claim 2, further comprising a biasing means for positioning the piston at a predetermined position relative to the cylinder.

13. The suspension device according to claim 3, further comprising a biasing means for positioning the piston at a predetermined position relative to the cylinder.

14. The suspension device according to claim 2, wherein the actuator includes a linear motion member, a motion conversion mechanism that converts linear motion of the linear motion member into rotational motion of a rotational member, and a motor that is coupled to the rotational member.

15. The suspension device according to claim 3, wherein the actuator includes a linear motion member, a motion conversion mechanism that converts linear motion of the linear motion member into rotational motion of a rotational member, and a motor that is coupled to the rotational member.

16. The suspension device according to claim 4, wherein the actuator includes a linear motion member, a motion conversion mechanism that converts linear motion of the linear motion member into rotational motion of a rotational member, and a motor that is coupled to the rotational member.

17. The suspension device according to claim 7, wherein the threaded shaft is inserted inside of the hollow rod, and includes a jam mechanism that stops rotation of the threaded shaft relative to the hollow rod.

18. The suspension device according to claim 8, further comprising an air spring that includes:
   a cylindrical air chamber member coupled to the case of the actuator;
   a cylindrical air piston coupled to the cylinder; and
   a cylindrical diaphragm that is bridged between the air chamber member and the air piston.

19. The suspension device according to claim 9, further comprising an air spring that includes:
   a cylindrical air chamber member coupled to the case of the actuator;
   a cylindrical air piston coupled to the cylinder; and
   a cylindrical diaphragm that is bridged between the air chamber member and the air piston.

* * * * *